(12) United States Patent
Mirales et al.

(10) Patent No.: US 6,921,085 B2
(45) Date of Patent: Jul. 26, 2005

(54) PACKAGING DESIGN INCORPORATING GASKET CLAMPING ASSEMBLIES AND INSTALLATION INSTRUCTIONS

(75) Inventors: James Mirales, Jamison, PA (US); James A. Westhoff, Langhorne, PA (US); James A. Kelly, Upper Black Eddy, PA (US)

(73) Assignee: Poly-Tec Products, Inc., Tullytown, PA (US)

(*) Notice: Subject to any disclaimer, the term of this patent is extended or adjusted under 35 U.S.C. 154(b) by 51 days.

(21) Appl. No.: 10/460,699

(22) Filed: Jun. 12, 2003

(65) Prior Publication Data

US 2003/0230860 A1 Dec. 18, 2003

Related U.S. Application Data

(60) Provisional application No. 60/388,026, filed on Jun. 12, 2002.

(51) Int. Cl.[7] .............................. F16L 5/02; F16J 15/52; B65D 69/00
(52) U.S. Cl. ...................... 277/606; 277/616; 277/635; 206/231
(58) Field of Search ................................ 277/634–635, 277/606–616; 220/582, 634; 24/16 PB, 30.5 R; 40/665, 664; 206/216, 223, 231, 335

(56) References Cited

U.S. PATENT DOCUMENTS

| | | | |
|---|---|---|---|
| 3,129,812 A | * | 4/1964 | Deasy ........................ 206/231 |
| 3,559,844 A | | 2/1971 | Schlosberg |
| 3,958,313 A | | 5/1976 | Rossborough |
| 3,960,395 A | | 6/1976 | Cirule et al. |
| 4,180,102 A | | 12/1979 | Larkin |
| 4,203,190 A | | 5/1980 | Temple et al. |
| 4,240,183 A | * | 12/1980 | Sumimoto et al. ........ 24/16 PB |
| 4,427,112 A | | 1/1984 | Di Giovanni et al. |
| 4,478,437 A | | 10/1984 | Skinner |
| 4,903,970 A | | 2/1990 | Ditcher et al. |
| 5,029,907 A | * | 7/1991 | Gundy ........................ 285/230 |
| 5,431,459 A | * | 7/1995 | Gundy ........................ 285/237 |
| 5,881,437 A | * | 3/1999 | Lilley ..................... 24/20 CW |
| 6,073,378 A | * | 6/2000 | Gabbert ........................ 40/661 |
| 6,145,167 A | * | 11/2000 | Brentini ........................ 24/3.1 |
| 6,152,455 A | * | 11/2000 | Brockway et al. .......... 277/576 |
| 6,283,312 B1 | * | 9/2001 | Edgerton ..................... 211/113 |

* cited by examiner

*Primary Examiner*—Alison Pickard
*Assistant Examiner*—Vishal Patel
(74) *Attorney, Agent, or Firm*—Volpe and Koenig, PC

(57) ABSTRACT

A package comprising gasket mounting clamps and instructions for mounting same. The mounting clamps include an expansion clamp and a takedown clamp. The expansion clamp engages an interior of a gasket inserted. The takedown clamp is looped in the gasket. The takedown clamp is urged against surface of either the expansion clamp or the gasket. A flexible fastener loops through the expansion clamp and around the takedown clamp passing through an opening in an instruction card retaining the card and takedown clamp within the gasket. The expansion clamp enables installation of gasket and expansion of the clamp without removing the fastener and without interference of the takedown clamp, fastener and card and permits observation of the card. The fastener loops through the expansion clamp and does not interfere with the expansion operation. The fastener remains intact until mounting a pipe to the gasket, assuring retention of the takedown clamp and instructions. The fastener retains either the card or the takedown clamp.

17 Claims, 5 Drawing Sheets

PACKAGING DESIGN INCORPORATING GASKET CLAMPING ASSEMBLIES AND INSTALLATION INSTRUCTIONS

CROSS REFERENCE TO RELATED APPLICATION(S)

This application claims priority from U.S. provisional application No. 60/388,026 filed Jun. 12, 2002, which is incorporated by reference as if fully set forth.

BACKGROUND

The present invention relates to gaskets for use in providing a liquid-tight seal between an opening in a sidewall and a pipe and more particularly to a novel packaging arrangement for retaining a gasket and the necessary clamping assemblies together, as well as an instruction card, the packaging arrangement further enabling installation of the gasket and at least one of the clamping assemblies without undoing the fastener holding the package together.

SUMMARY

Rubber or rubber-like gaskets are typically utilized, for example, in sewage systems for providing a liquid-tight seal between a pipe and an opening in a sidewall of a cast member, such as, for example, a manhole assembly.

There are two standard techniques for mounting a gasket within an opening in a cast member. The first one of these techniques comprises imbedding an embedment portion of a gasket into a cast member during a casting operation wherein the gasket is arranged within the mold members of a casting assembly whereby the gasket is integrally joined to the cast member during the casting operation when the cast member is being formed (at the factory, for example).

Another technique is to mount a gasket into an opening in a sidewall of a cast member wherein the opening may either be formed during a casting operation or may be formed by the step of coring an opening in the cast member prior to installation of a gasket, which operation is typically performed by a coring machine, which machines are well-known in the art. Gaskets mounted into a cast member after a casting operation are provided with a mounting portion which has a surface designed to make substantially intimate engagement with the surface of the opening. An expansion clamp is placed against the interior surface of the gasket mounting portion and is expanded by an amount sufficient to expand the gasket mounting portion and compress the gasket mounting portion between the expansion band and the opening in the sidewall of the cast member which is sufficient to maintain a liquid-tight seal satisfactory to withstand a given level of pressure which may be exerted by subsurface water upon the liquid-tight seal between the gasket and the cast member.

After the gasket has been mounted and the expansion clamp has been expanded by the desired amount, the gasket is then ready to receive a pipe which is inserted into the opposite end of the gasket which serves as a pipe engaging portion, the pipe being inserted into the gasket so that the pipe engaging portion engages and encircles the exterior surface of the pipe. In order to assure a proper liquid-tight seal, a takedown clamp is placed about the outer periphery of the gasket pipe engaging portion. The takedown clamp is tightened by an amount suitable to provide the desired liquid-tight seal between the gasket and the pipe.

Heretofore, the components making up the gasket mounting assembly, namely the gasket and the clamping assemblies, lack any packaging design or arrangement wherein the aforesaid components are retained in such a manner as to prevent their separation from one another during the time that they are manufactured and ultimately shipped to a job site and until the time at which they are installed, while at the same time retaining the components in a compact manner and enabling performance of the mounting operation of the gasket and expansion-type clamping assembly without necessity for separating the components until the time that they are to be installed.

The present invention is characterized by comprising an arrangement for packaging and retaining the gasket and its associated components in a manner which assures that the components are retained as a unified package preparatory to their use while at the same time enabling the operation of mounting the gasket in a sidewall opening of a cast member and expanding the expansion clamp without interference of the other components in the performance of the aforesaid operation, thereby assuring that the gasket and its associated components are all retained in the packaging arrangement until they are ready for use thereby preventing separation and loss of the components which can lead to wasted man hours at a job site until the proper components are located.

The gasket of the present invention, in one preferred embodiment, is formed of a rubber or rubber-like material and having an annular mounting end for mounting in an opening of a cast member, a pipe engaging end and an intermediate portion extending between the mounting end and the pipe engaging portion. The pipe engaging end is typically of a smaller diameter than the mounting end, the intermediate portion tapering from the mounting end to the pipe engaging end. However, the present invention may be utilized with equal success in gaskets in which the pipe engaging ends are equal in diameter to the mounting ends.

The interior surface of the mounting end is preferably provided with an annular expansion clamp receiving region along its interior surface. The expansion clamp receiving surface assures proper alignment of the expansion clamp in the operative position. A takedown clamp, employed to encircle the gasket in the region of the pipe engagement portion, is arranged within the interior of the gasket and is preferably looped to form an annular configuration. Typically, the takedown clamp is formed of a suitable metallic material having a "memory" causing the takedown clamp, when the two free ends are not joined, to be urged outwardly and against the interior surface of the gasket. The takedown clamp is positioned so that it engages or is in close proximity to the expansion clamp which is preferably expanded somewhat to assure its retention in the operative position within the recess provided in the gasket for receiving and aligning the expansion clamp.

A fastener is looped through a portion of the expansion clamp, and the takedown clamp, and also passes through an opening in an instruction card to retain the takedown clamp and instruction card within the interior of the gasket, the expansion clamp serving as the "anchor", the expansion clamp being expanded sufficiently to be retained within the gasket while the fastener retains the takedown clamp and instruction card within the hollow interior of the gasket.

The fastener, in one embodiment, is looped through the expansion clamp in such a manner that no part of the fastener lies between the expansion clamp and the gasket in the region of the expansion clamp receiving region so as not to degrade the liquid-tight seal provided by the expansion clamp and further to permit total removal of the fastener without either loosening or removal of the expansion clamp from the gasket.

Although the instruction card is in a position to be readily and easily observable in order to read the instructions thereon for mounting the gasket in the sidewall opening and expanding the expansion clamp, neither the instruction card nor the takedown clamp nor the fastener interfere with these installation operations. In addition, the fastener is looped through the expansion clamp in such a manner as to prevent the fastener from being severed while the expansion clamp is being manipulated and expanded. This arrangement enables the takedown clamp and instruction card to be retained within the gasket indefinitely and at least until the operation of installing the pipe in the pipe engagement portion of the gasket is to be performed, thereby assuring that the takedown clamp and instruction card are both handy and immediately available when the insertion of the pipe into the gasket is to be performed while at the same time positively retaining the instruction card and takedown clamp in a highly convenient location in readiness for the pipe insertion operation.

BRIEF DESCRIPTION OF THE DRAWING(S)

The above, as well as other objects of the present invention, will become apparent when reading the accompanying description of the drawings wherein like elements are designated by like numerals and wherein.

DETAILED DESCRIPTION OF THE PREFERRED EMBODIMENT(S)

Figure 1:
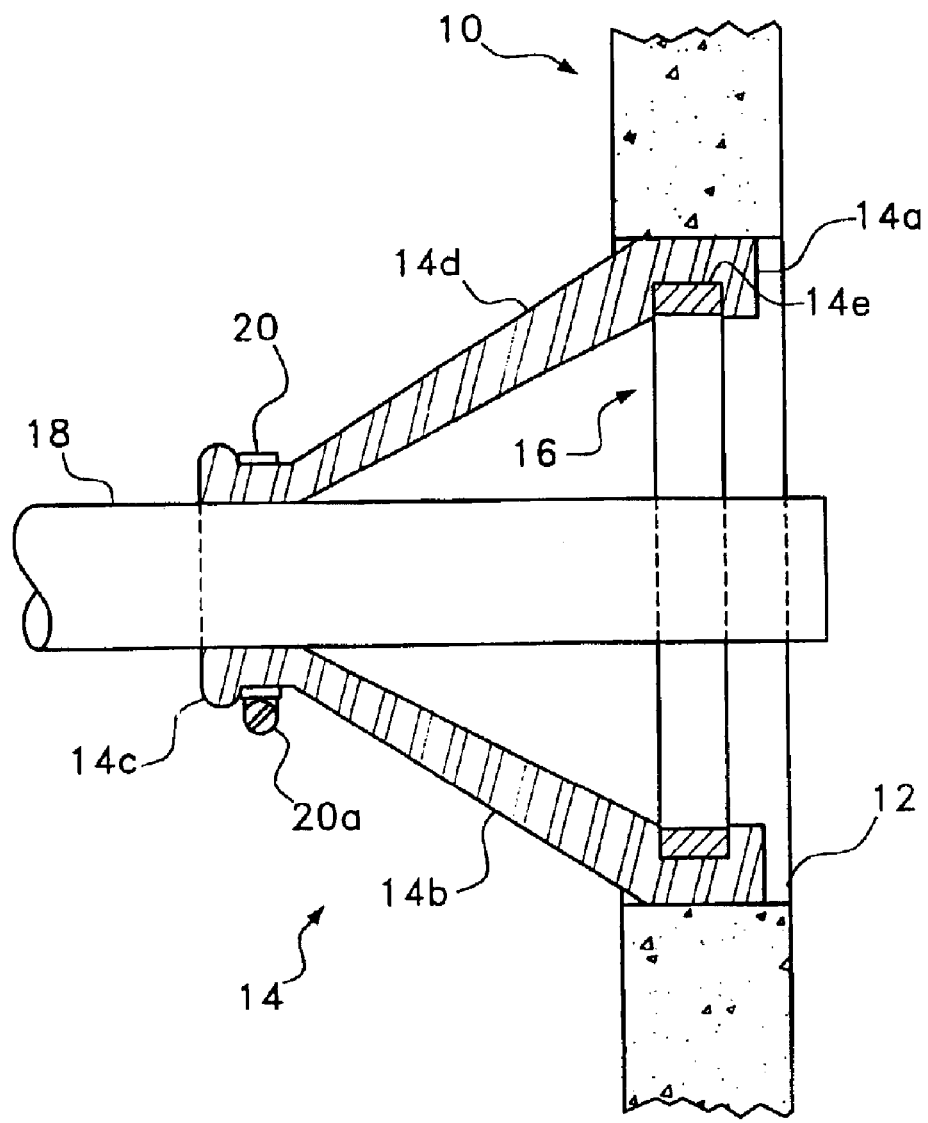
FIG. 1 is a sectional view showing a gasket in a fully assembled position and providing a liquid-tight seal between an opening in a cast member and a pipe.

FIG. 1 shows a gasket assembly which may employ the package design arrangement of the present invention to great advantage, the gasket assembly being shown in the fully assembled state. The assembly of FIG. 1 shows a wall of a cast member 10 such as a manhole assembly. Cast member 10, which may typically be formed of a suitable cast material, such as concrete, is provided with an opening 12 for receiving and supporting the mounting portion 14a of gasket 14, further having a pipe engaging end 14b provided with a beaded annular end portion 14c. An intermediate portion 14d of gasket 14 extends between and is integral with mounting portion 14a and pipe engaging portion 14b.

An expansion-type clamping band 16 is arranged within the interior of gasket 14 and is positioned within an annular recess 14e which receives and positions the expansion band 16 in the operative position.

A pipe 18 is inserted into the hollow interior of the pipe engaging region 14b and to further assure a proper liquid-tight seal, a takedown clamp 20 is placed about the outer periphery of the gasket and suitably tightened to provide a liquid-tight seal. In order to obtain a desired liquid-tight seal between gasket 14 and cast member 10, the expansion clamp is expanded, typically by a torque wrench, to provide the desired liquid-tight seal.

The gasket 14 is of a conventional design and is preferably formed of a rubber or rubber-like material which is compressible and at least partially expandable. The expansion band 16 expands radially outward and urges the mounting portion 14a of gasket 14 into intimate engagement with the opening 12 to provide the desired liquid-tight seal. The portion of the gasket lying between band 16 and opening 12 undergoes at least some compression. The expansion-type clamping band is preferably of the type described in co-pending application Ser. No. 09/880,413 filed Jun. 13, 2001 by the assignee of the present application and the detailed description thereof is incorporated herein by reference thereto. Alternatively, the expansion band may be of the type described in provisional application Ser. No. 60/356,549 filed Feb. 13, 2002 and assigned to the assignee of the present invention. Although other types of expansion bands may be used, the above-mentioned expansion bands are preferred because of advantageous features as will be described in detail below.

The takedown clamp 20 is a conventional clamp finding widespread use throughout a variety of different industries, and is similar to those quite frequently used, for example, as a takedown or tightening clamp for rubber hoses employed in automotive cooling systems utilized in cars, trucks, and even farm equipment. It is typically tightened by a screw member having a head 20a for receiving the tip of a conventional screw driver, for example. The take down clamp may be formed of plastic, metal or a combination plastic/metal.

Figure 2:
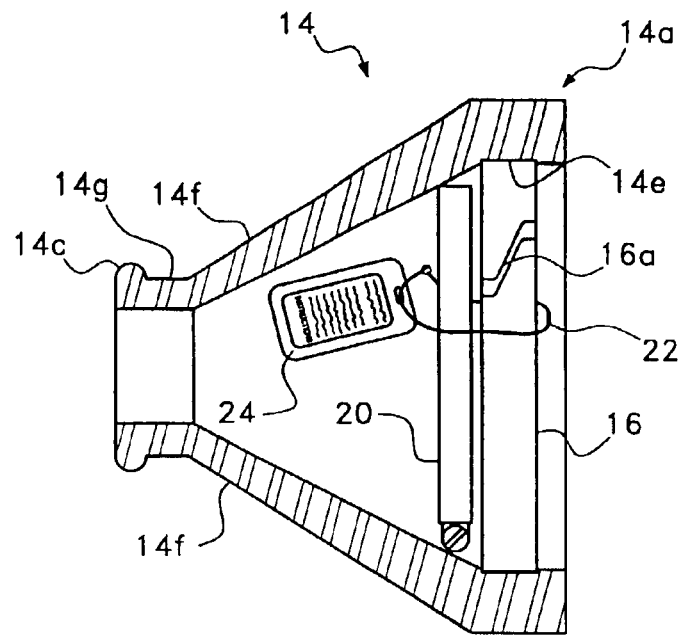
FIG. 2 shows the gasket of FIG. 1 with the associated clamp assemblies arranged according to the packaging design of the present invention.

FIG. 2 shows the packaging design of the present invention employing the components shown in FIG. 1.

The expansion band 16 is positioned within the recess 14e provided at the mounting end of gasket 14 and is preferably expanded slightly so as to be retained therein even in the event of any rough handling. The takedown clamp 20 is also arranged within the interior of gasket 14 and is preferably either engaging expansion band 16 or is in close proximity therewith.

Figure 5:
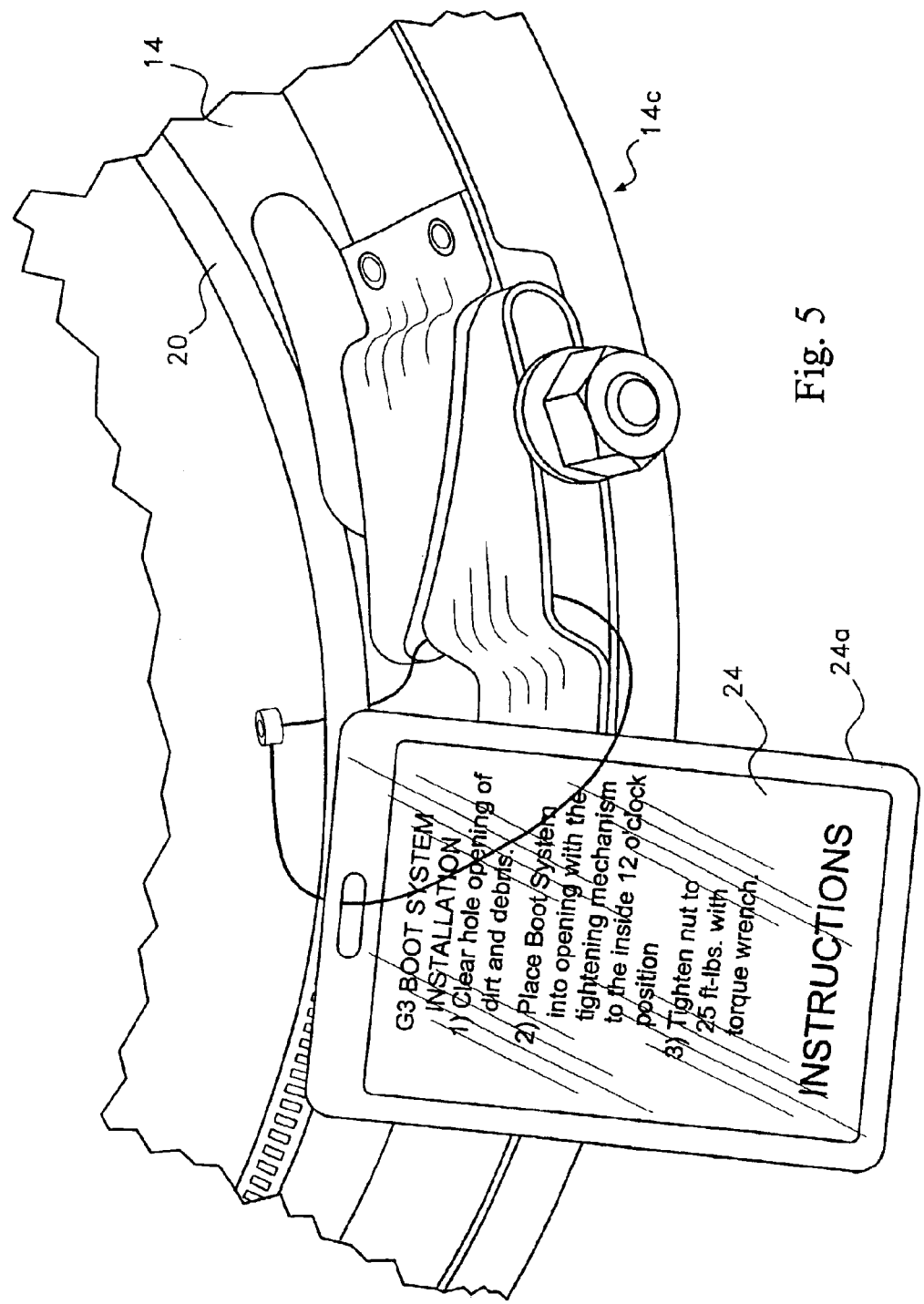
FIG. 5 shows a detailed view of the instructions on the card forming part of the package.

A fastener 22, which is preferably a plastic member of either wire-like or band-like cross-sectional configuration is looped through a portion of the expansion mechanism, 16a of expansion band 16, is looped around the takedown clamp 20 and further passes through an opening in an instruction card 24, shown in detail in FIG. 5 and provided with instructions for installation of the gasket, the expansion band and the takedown clamp. Card 24 may be an instruction sheet arranged within a transparent plastic envelope 24a to protect the instruction card from the elements. If desired, the tie down may be looped about the expansion clamp.

Figures 2A, 2B:
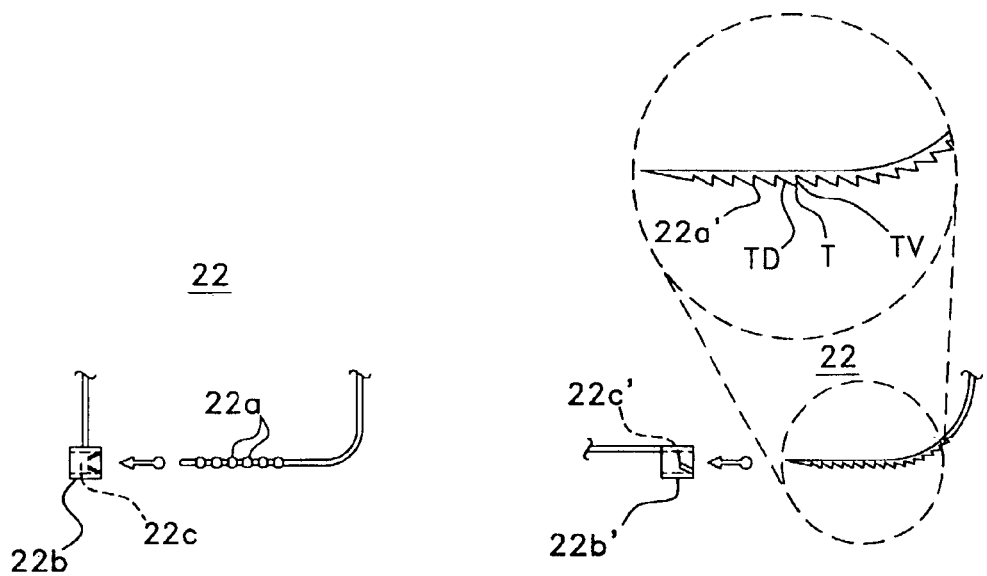
FIGS. 2a and 2b show alternative fasteners usable in the package of FIG. 2.

The fastener 22 may be any suitable fastener such as any of the well-known tie wraps. Some examples of the tie wraps that may be used are shown in FIGS. 2a and 2b. The embodiment 22 shown in FIG. 2a is comprised of an elongated, continuous plastic member provided with enlargements 22a at spaced intervals moving inward from one end thereof. The opposite end is provided with a locking member 22b. The end having the spaced enlargements is urged into an opening 22c in locking member 22b and, so long as one of the enlargements passes a given point within the locking member, the tie wrap 22 may not be pulled apart. Metallic or combination metal/plastic tie wraps may be employed.

The embodiment 22' shown in FIG. 2b is comprised of a substantially flat, elongated member having a saw-toothed configuration 22a'. The opposite end thereof is provided with a locking member 22b'. The end having a saw-toothed configuration is inserted into opening 22c' in the locking member and, so long as one of the teeth pass a given position within the locking member 22b', the tie wrap may not be pulled apart. The diagonally aligned surface $T_D$ of each tooth, such as T, allows the end 22' to pass through opening 22c' when pulled in the "tightening" direction, and having a vertically aligned surface $T_V$ which prevents the end 22a' from being pulled out of opening 22c'.

It should be understood that any other form of tie wrap may be utilized including a cord or a wire looped in the manner described and then having its free ends twisted or tied together, although a tie wrap having a locking feature is preferred in order to prevent the tie wrap from being easily separated and thereby causing separation of and possible misplacement or loss of the components being linked together by means of the fastener. The tie wrap preferably is of a thickness which enables the end 22a (or 22a') to pass through an opening in the take down clamp to assure its retention in the package. The tie down does not interfere with the operation of tie take down clamp since the tie down is removed to enable placement of the take down clamp about the gasket.

Figure 4:
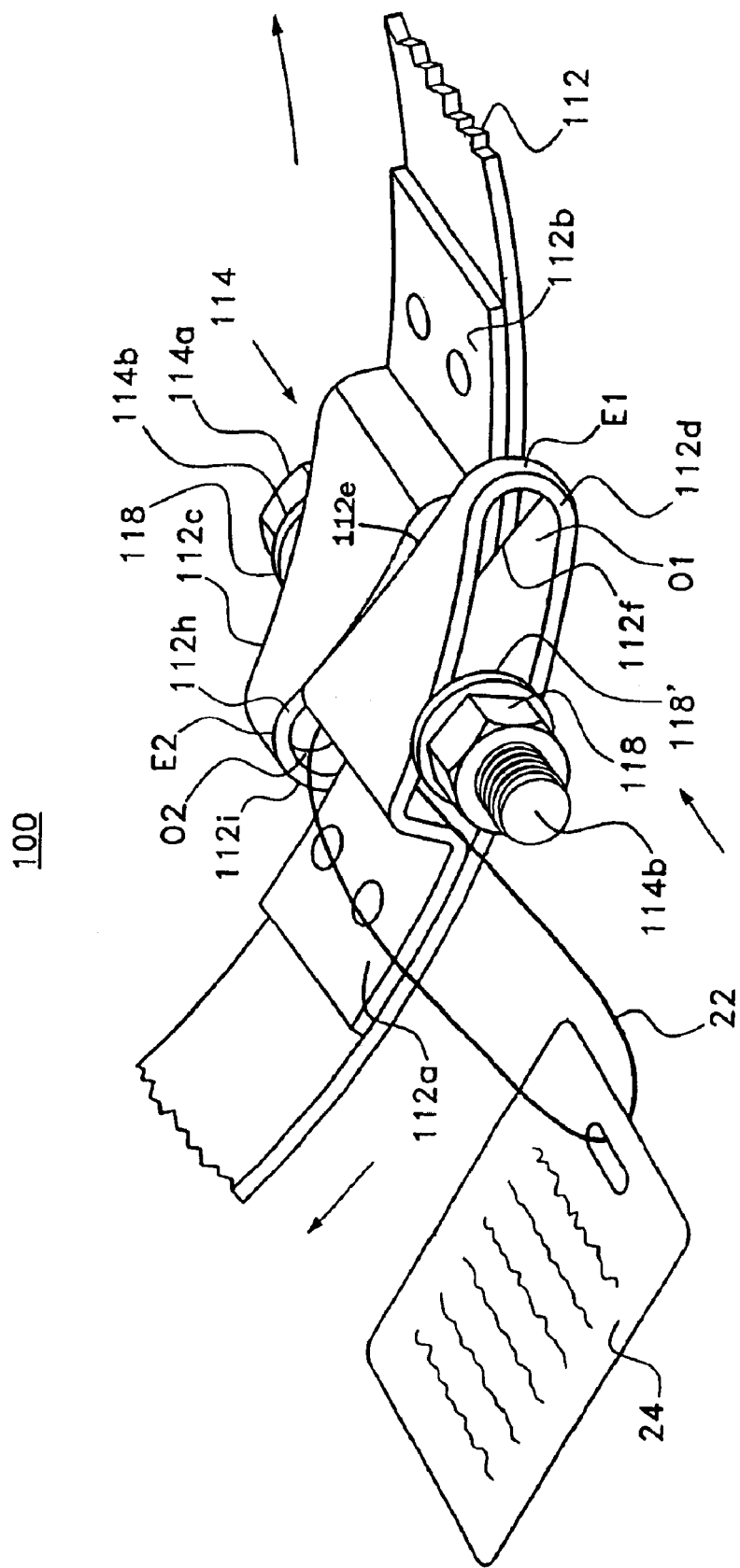
FIG. 4 shows a detailed perspective view of the expansion clamp of FIG. 2.

FIG. 4 is a perspective view showing a first preferred embodiment 100 of a clamping band assembly embodying the principles of the present invention. The assembly 100 is comprised of an elongated band 112 formed from a single stainless sheet of steel stock of a suitable thickness such as, for example, 0.105 inches. As shown in FIG. 1a of co-pending application Ser. No. 09/880,413, the band 112 is initially formed from a flat sheet of metallic material, preferably stainless steel; and is provided with first and second substantially V-shaped cut-outs C1 and C2 arranged on opposite longitudinal sides 112c and 112d of the band 12. However a plastic clamping band or combination plastic/metal clamping band may be employed as described in application Ser. No. 09/880,413.

The V-shaped cut-out C1 is defined by tapering surfaces 112e, 112f, on opposite sides of curved end portion E1. Similarly, surfaces 112h, 112i lie on opposite sides of curved, end portion E2.

Ends the clamping band 112 is further bent inwardly from the free ends 112a and 112b which are secured to the main body of clamping band 112, preferably by spot welds SW. The opposite ends of clamping band 112 form a pair of hollow, elongated guide channels O1 and O2 to receive compression means which align and expand the clamping band.

Figure 3:
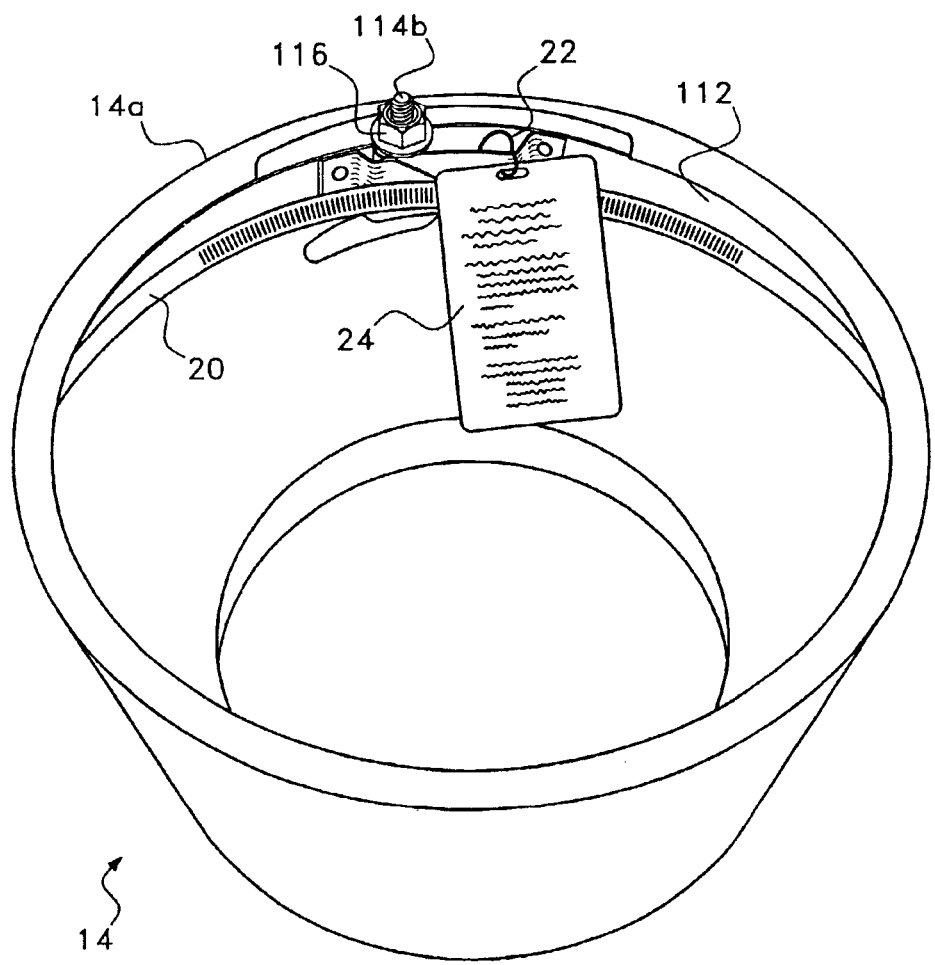
FIG. 3 is a perspective view showing an interior view of the design arrangement of FIG. 2.

The clamping band 112 is bent into a circular configuration as shown in FIG. 3 with the end portions of the clamping band laterally overlapping one another in a direction perpendicular to the circumferential direction, as shown in FIG. 1. The "skewed" surfaces 112h, 112i and 112e, 112f are arranged so they slidably engage one another.

The threaded body 114b of a bolt 114 extends through and beyond opening O1 and is threadedly engaged by a nut 116. A washer 118 is arranged between nut 116 and surface 112d. A similar washer 118 may be arranged between bolt head 114a and surface 112c.

The manner in which the expansion type clamping is utilized is as follows:

In applications wherein it is desired to form a liquid-tight seal between the gasket and a cored opening in a cast member such as, for example, a septic tank, catch basin or a manhole base assembly, or the like, an opening is formed in a sidewall of the cast member through suitable coring equipment (not shown), employed in situ, which is conventional and is well known and is widely used in the sewage system and septic tank field. Although coring equipment may be designed to form a opening in a cast member of relatively precise diameter and size, continued use of the coring equipment causes wearing which directly affects the size of the opening formed in cast member. Also in the case where the cast holes having a 2 degree taper are provided in the cast member, although the holes are precise, placement of the gasket in the hole can create the need for an adjustable expansion band. It is thus important to provide an expansion type clamping band which, in addition to being rugged and reliable and easy to use, has a capability of being easily adjustable to accommodate deviations in size (i.e., diameter) from an opening of an otherwise desired size.

Once the opening has been formed either by casting or by coring equipment, a portion of the gasket being installed is placed so that its internal clamping end is arranged within the cored opening. For example, the cast member and gasket may be of the type referred to as the cast member shown in FIG. 1 and receiving a connector boot 204 shown in FIG. 2 of U.S. Pat. No. 5,431,459, issued Jul. 11, 1995, which description is incorporated herein by reference thereto. The internal clamping end 206 of the boot is joined to a pipe connecting end 208 by an intermediate tapered portion 210.

The expansion type clamping band 16 of the present invention is placed within the interior region of the connector boot internal clamping end and against the inner periphery of the gasket so that its end portions overlap and occupy the relative positions shown in FIG. 4. In this position, it can be seen that the distance measured across the overlapping lateral portions of the band 112 can be as much as almost double the width of the clamping band 112, depending upon the amount of overlap. However, when the nut 116 is tightened, the lateral width decreases sufficiently to enable insertion of the tie down in the manner described below.

The nut 116 is tightened, forcing the two ends of the clamping band to move toward a central longitudinal axis of the band 112. This tightening causes the engaging sliding surfaces 112e–112h, 112i–112f slide along one another, thereby moving the ends of the clamping band towards alignment with the aforementioned central longitudinal axis. As nut 116 is tightened, the sliding engagement of the skewed surfaces force the free ends of the band together as additional force is applied. In addition to forcing the two ends of the band together, the diameter and hence circumference of the expansion type clamping band 16 is continually increased, causing the clamping band to exert outward radial forces against the internal clamping end of the gasket, forcing the gasket in an outward radial direction and compressing the gasket between the clamping band and the interior periphery of the cored opening in the cast member to thereby create a water-tight seal.

In order to be assured that the clamping band has been expanded sufficiently to obtain the desired watertight seal, a torquing device, such as a torque wrench with a visible readout of torque, which is conventional and well known in the industry, may be utilized. The torquing wrench is placed on nut 116 and is tightened. The torque reading of the torquing device is observed and tightening of the nut is completed when the desired torque reading is reached. The torque reading is obtained through the compilation of empirical data and the proper torque, typically within a given range, is normally provided with instructions for installation of the expansion band. In the present invention, the expansion band is typically installed using torquing in the range of from 20 to 30 foot-pounds. However, this range is merely exemplary and has no bearing on the usefulness of the package of the present invention. It should be noted that the instructions on card 24 provide the desired torquing information included as part of the instructions for installation.

The tie wrap 22 may be threaded through channel O1 at the left-hand end of opening O1 opposite the curved end E1, as shown in FIG. 4. It should be understood that the tie wrap is threaded through the left-hand end of opening O1 when the clamping band is expanded by an amount sufficient to displace the left-hand end to the left of curved and E2. Thus, as the portions E1 and E2 move toward one another, end E2 moving toward the right and E1 moving toward the left in FIG. 4, the tie wrap 22 will not shear or be otherwise cut or damaged as the expansion band is expanded, enabling the tie wrap and the takedown clamp to be retained in position even after installation of the gasket and expansion of the expansion band. For example, the pipe may not be inserted into the end 14b of gasket14 for several days or so after installation of the gasket in the cast member. The package design of the present invention assures the immediate availability of the takedown clamp when the operation of installing the pipe is ready to be performed. This may be accomplished simply by cutting or otherwise severing the tie down 22 and removing the instruction card and the takedown clamp. The takedown clamp is removed from the interior of the gasket, the pipe is inserted into the pipe engaging end using conventional installation techniques (which are preferably set forth on the instruction card). After insertion of the pipe into the gasket, the takedown clamp is placed about the outer periphery of the gasket and preferably immediately adjacent bead 14c. The takedown clamp is tightened appropriately to achieve the desired liquid-tight seal. If desired, a second projection 14f may be provided inwardly from bead 14c to collectively define an annular region for receiving the takedown clamp. Alternatively, an annular recess 14g may be provided to receive and position the takedown clamp.

It can be seen from the above description that novel packaging arrangement assures the retention of all the components necessary for installation of a gasket, significantly reducing installation time by avoiding the need to locate the components necessary for installation and further assuring retention of the takedown clamp within the gasket even after the expansion clamp has been expanded thereby serving as a convenient "storage" facility until the operation of installing the pipe is performed.

What is claimed is:

1. In combination:
    a gasket having an annular-shaped mounting end for mounting in an opening of a cast member;
    an annular-shaped pipe engaging end for receiving a pipe and a hollow intermediate section arranged between and respectively integrally joined to said mounting end and said pipe engaging end;
    an expansion-type clamping band placed in said gasket and engaging an interior surface of said mounting end, said expansion-type clamping band being expanded to a circumference sufficient to retain said expansion-type clamping band within said gasket so that the expansion-type clamping band will not be dislodged therefrom;
    a take-down clamp assembly, for tightening the pipe engaging end of the gasket about a pipe, being looped to assume an annular configuration and being positioned in the interior of said gasket and in close proximity to said expansion-type clamping band;
    a card having instructions for mounting the gasket; and
    a fastener looped around or through a portion of said expansion-type clamping band and through an opening in said card and around or through said take down clamp and enabling said gasket to be mounted in an opening and said expansion-type clamping band to be expanded without interfering with the mounting and expanding operations and enabling the instructions to be easily observed without interfering with the mounting operation.

2. The arrangement of claim 1 wherein said instruction card is encased in a transparent plastic case to protect the instruction card.

3. The arrangement of claim 1 wherein the takedown clamp is formed of a metallic material having a memory causing free ends of the takedown clamp to be urged outwardly toward said gasket which serves to maintain the takedown clamp in its position in the gasket.

4. The arrangement of claim 1 wherein the takedown clamp rests against the expansion-type clamping band.

5. The arrangement of claim 1 wherein the gasket interior surface of the gasket has an annular recess for receiving the expansion-type clamping band in the region of said mounting end to retain the expansion-type clamping band in an operative position for expansion.

6. The arrangement of claim 1 wherein the gasket interior surface of the gasket has a pair of annular projections defining an annular recess for receiving the expansion-type clamping band in the region of said mounting end to retain the expansion-type clamping band in an operative position for expansion.

7. The arrangement of claim 1 wherein said gasket has means which aids in placement of the takedown clamp about the outer periphery of the gasket.

8. The arrangement of claim 1 wherein the expansion-type clamping band has a pair of guide channels for guiding compression members;
    said fastener being looped through one of said guide channels.

9. The arrangement of claim 8 wherein said fastener extends through an end of said one of said guide channels which prevents the fastener from being severed when the expansion-type clamping band is expanded and which prevents the fastener from interfering with an expansion operation.

10. The arrangement of claim 1 wherein said fastener is an elongated flexible member having an enlargement at one free end and a locking member at a remaining free end, said locking member permitting insertion of said enlargement into said locking member and preventing removal of the enlargement from the locking member when the enlargement has been inserted by at least a given depth into said locking member.

11. The arrangement of claim 1 wherein said fastener is an elongated flexible member having a saw-toothed configuration at one free end and a locking member at a remaining free end, said saw-tooth configuration cooperating with said locking member permitting insertion of said one free end into said locking member and preventing removal of said one free end from the locking member when at least one tooth of the saw-tooth configuration has been inserted by at least a given depth into said locking member.

12. In combination:
    a gasket having an annular-shaped mounting end for mounting in an opening of a cast member;
    an annular shaped pipe engaging end for receiving a pipe and a hollow intermediate section arranged between and respectively integrally joined to said mounting end and said pipe engaging end;
    an expansion-type clamping band placed in said gasket and engaging an interior surface of said mounting end, said expansion-type clamping band being expanded to a circumference sufficient to retain said expansion-type clamping band in firm engagement with said gasket so that the expansion-type clamping band will not be dislodged therefrom;

a take-down clamp assembly for tightening the pipe engaging end of the gasket about a pipe being looped to assume an annular configuration and being positioned in the interior of said gasket and in close proximity to said expansion-type clamping band; and a close-looped fastener looped through a portion of said expansion-type clamping band and around said take-down clamp and enabling said gasket to be mounted in an opening and said expansion-type clamping band to be expanded without interfering with the mounting and expanding operations and enabling the instructions to be easily observed without interfering with the mounting operation.

13. In combination:

a gasket having an annular-shaped mounting end for mounting in an opening of a cast member;

an annular shaped pipe engaging end for receiving a pipe and a hollow intermediate section arranged between and respectively integrally joined to said mounting end and said pipe engaging end;

an expansion-type clamping band placed in said gasket and engaging an interior surface of said mounting end, said expansion-type clamping band being expanded to a circumference sufficient to retain said expansion-type clamping band in firm engagement with said gasket so that the expansion-type clamping band will not be dislodged therefrom;

a card having instructions for mounting the gasket; and a close-looped fastener looped through a portion of said expansion-type clamping band and through an opening in said card and enabling said gasket to be mounted in an opening and said expansion-type clamping band to be expanded without interfering with the mounting and expanding operations and enabling the instructions to be easily observed without interfering with the mounting operation.

14. In combination:

a gasket having an annular-shaped mounting end for mounting in an opening of a cast member;

an annular shaped pipe engaging end for receiving a pipe and a hollow intermediate section arranged between and respectively integrally joined to said mounting end and said pipe engaging end;

an expansion-type clamping band placed in said gasket and engaging an interior surface of said mounting end, said expansion-type clamping band being expanded to a circumference sufficient to retain said expansion-type clamping band in firm engagement with said gasket so that the expansion-type clamping band will not be dislodged therefrom;

a take-down clamp assembly for tightening the pipe engaging end of the gasket about a pipe being looped to assume an annular configuration and being positioned in the interior of said gasket and in close proximity to said expansion-type clamping band; and a close-looped fastener looped about said expansion-type clamping band and said takedown clamp and enabling said gasket to be mounted in an opening and said expansion-type clamping band to be expanded without interfering with the mounting and expanding operations and enabling the instructions to be easily observed without interfering with the mounting operation.

15. The arrangement of claim 14 wherein the free ends of fastener are joined to retain the takedown clamp and the expansion clamp.

16. In combination:

a gasket having an annular-shaped mounting end for mounting in an opening of a cast member;

an annular shaped pipe engaging end for receiving a pipe and a hollow intermediate section arranged between and respectively integrally joined to said mounting end and said pipe engaging end;

an expansion-type clamping band placed in said gasket and engaging an interior surface of said mounting end, said expansion-type clamping band being expanded to a circumference sufficient to retain said expansion-type clamping band in firm engagement with said gasket so that the expansion-type clamping band will not be dislodged therefrom;

a card having instructions for mounting the gasket; and a close-looped fastener looped through a portion of said expansion-type clamping band and through an opening in said card and enabling said gasket to be mounted in an opening and said expansion-type clamping band to be expanded without interfering with the mounting and expanding operations and enabling the instructions to be easily observed without interfering with the mounting operation.

17. The arrangement of claim 16 wherein the free ends of said fastener are joined to retain the card and the expansion band.

* * * * *